Jan. 5, 1926.
E. ATWOOD
1,568,539
SPINDLE DRIVING MECHANISM
Filed April 6, 1922     2 Sheets-Sheet 1
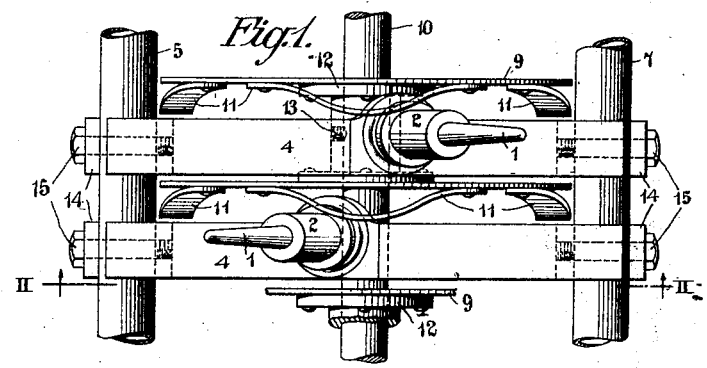
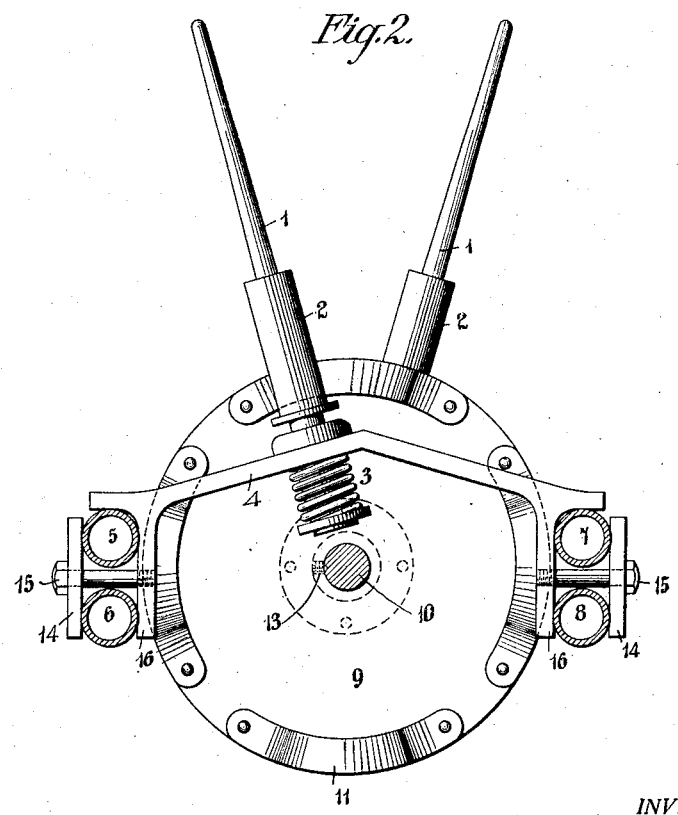
INVENTOR
ATTORNEYS Jan. 5, 1926.  1,568,539
E. ATWOOD
SPINDLE DRIVING MECHANISM
Filed April 6, 1922   2 Sheets-Sheet 2

INVENTOR
ATTORNEYS

Patented Jan. 5, 1926.

1,568,539

UNITED STATES PATENT OFFICE.

EUGENE ATWOOD, OF STONINGTON, CONNECTICUT, ASSIGNOR TO ATWOOD MACHINE COMPANY, OF STONINGTON, CONNECTICUT, A CORPORATION OF NEW JERSEY.

SPINDLE-DRIVING MECHANISM.

Application filed April 6, 1922. Serial No. 550,148.

*To all whom it may concern:*

Be it known that I, EUGENE ATWOOD, a citizen of the United States, and resident of Stonington, in the county of New London and State of Connecticut, have invented a new and useful Improvement in Spindle-Driving Mechanism, of which the following is a specification.

The object of my invention is to provide novel means for mounting and driving spindles.

Practical embodiments of my invention are represented in the accompanying drawings, in which Fig. 1 represents a detail top plan of one embodiment.

Fig. 2 represents a transverse section taken in the plane of the line II—II of Fig. 1, looking in the direction of the arrows.

Figure 3:
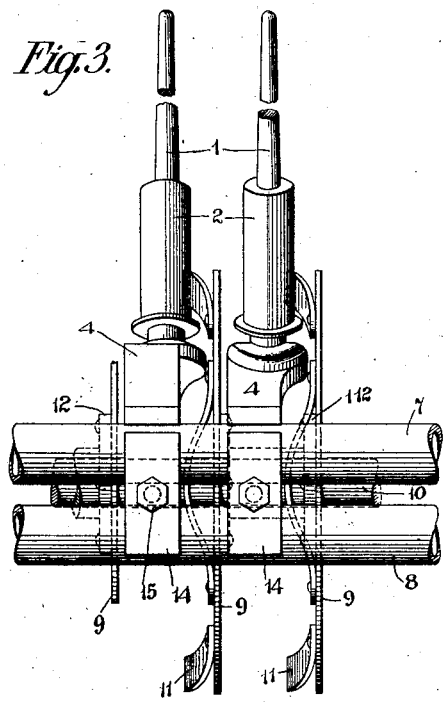
Fig. 3 represents a detail side elevation of the embodiment shown in Figs. 1 and 2.

The spindles are denoted by 1, their whorls by 2 and their bolsters by 3. The spindle supports are shown as bridges 4, secured at their ends to pairs of machine frame bars 5, 6 and 7, 8, arranged parallel to each other and spaced the desired distance apart to receive between them the rotary spindle driving discs 9 which are mounted on the rotary shaft 10. This shaft 10 may be driven from any suitable source of power, not shown herein.

Some of the spindles may be forwardly inclined and others rearwardly inclined, but all of the spindles are so mounted on their bridge supports as to be radially disposed with respect to the rotary driving shaft 10.

The rotary discs 9 are provided with surfaces, preferably yielding, positioned to frictionally engage the spindle whorls 2 for driving the spindles.

In the present instance these surfaces are shown as bulging flexible straps 11, secured at their ends to the faces of the discs 9, adjacent to the periphery of the discs and annularly disposed so as to be brought into engagement with the spindle whorls.

In the form shown in Figs. 1, 2 and 3, a spindle driving rotary disc is provided for each spindle, and a single spindle is mounted on each bridge adjacent to its rotary disc. In this form, alternate spindles are inclined forwardly and the remaining spindles inclined rearwardly so as to provide ample room for the insertion and removal of the bobbins.

Figure 4:
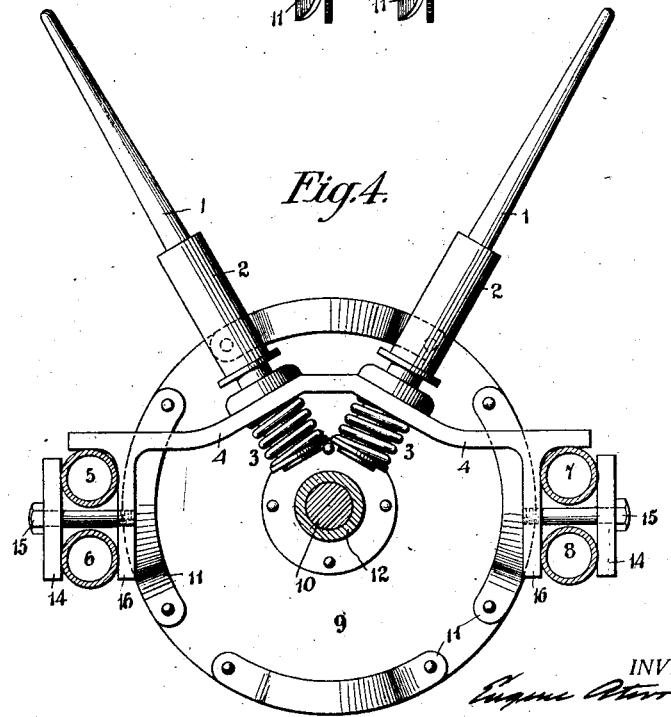
Fig. 4 represents a transverse section, showing a modified form.

In the form shown in Fig. 4, each spindle driving disc is shown as arranged to drive two spindles, one inclined forwardly and the other rearwardly, both spindles being mounted on one bridge, located in proximity to their driving disc.

For convenience in mounting the discs, I have shown each pair of discs as secured to a hub 12, slidably and rotatably adjustable on the shaft 10, a set screw 13 being provided for securing the hub in its adjusted position on the said shaft.

As a convenient means for mounting the spindles in their forwardly and rearwardly inclined positions respectively, and radially disposed with respect to the shaft 10, I have provided the bridges 4, with oppositely inclined portions.

As a means for securing the opposite ends of the bridges to their pairs of longitudinal machine bars, I have provided clamping plates 14 and bolts 15, arranged to coact with the depending flanges 16, to clamp the pairs of bars therebetween.

It is evident that various changes may be made in the construction, form and arrangement of the several parts without departing from the spirit and scope of my invention; hence I do not wish to limit myself to the particular embodiments herein shown and described, but—

What I claim is:—

1. A rotary spindle driving disc, and a spindle disposed radially with respect to the axis of rotation of said disc, the face of the disc being provided with one or more sectional surfaces positioned to frictionally engage the spindle whorl.

2. A rotary spindle driving disc, and a spindle disposed radially with respect to the axis of rotation of said disc, the face of the disc being provided with one or more yielding sectional surfaces positioned to frictionally engage the spindle whorl.

3. A rotary spindle driving disc, and a spindle disposed radially with respect to the axis of rotation of said disc, the face of the disc being provided with one or more bulging flexible straps positioned to frictionally engage the spindle whorl.

4. A plurality of rotary spindle driving discs, and spindles disposed radially with respect to the axis of rotation of said discs, the faces of the discs being provided with one or more sectional surfaces positioned to frictionally engage the spindle whorls.

5. A plurality of rotary spindle driving discs, and spindles disposed radially with respect to the axis of rotation of said discs, the faces of the discs being provided with one or more yielding sectional surfaces positioned to frictionally engage the spindle whorls.

6. A plurality of rotary spindle driving discs, and spindles disposed radially with respect to the axis of rotation of said discs, the faces of the discs being provided with one or more bulging flexible straps positioned to frictionally engage the spindle whorls.

In testimony that I claim the foregoing as my invention, I have signed my name this 4th day of April 1922.

EUGENE ATWOOD.